United States Patent [19]

Fueki et al.

[11] Patent Number: 5,777,963

[45] Date of Patent: Jul. 7, 1998

[54] DEVICE FOR OPENING AND CLOSING A TRACKING SERVO LOOP OF AN OPTICAL DISC REPRODUCTION DEVICE IN ACCORDANCE WITH THE VALUE OF AN ON-TRACK SIGNAL

[75] Inventors: Hiroyuki Fueki; Wataru Hasegawa, both of Tokorozawa, Japan

[73] Assignee: Pioneer Electronic Corporation, Tokyo-to, Japan

[21] Appl. No.: 724,924

[22] Filed: Oct. 2, 1996

Related U.S. Application Data

[63] Continuation of Ser. No. 255,349, Jun. 8, 1994, abandoned.

[30] Foreign Application Priority Data

Jun. 10, 1993 [JP] Japan .................. 5-138292

[51] Int. Cl.[6] .................................................. G11B 7/095
[52] U.S. Cl. ........................... 369/44.34; 369/44.35
[58] Field of Search ......................... 369/44.26, 44.29, 369/44.34, 44.35

[56] References Cited

U.S. PATENT DOCUMENTS 4,661,942  4/1987  Yoshimoto et al. ............... 369/44.34

Primary Examiner—W. R. Young
Attorney, Agent, or Firm—Kane,Dalsimer,Sullivan,Kurucz,Levy,Eisele and Richard, LLP

[57] ABSTRACT

A servo control device for controlling operation of tracking servo loop includes: on-track signal generating unit for generating on-track signal indicating whether a light beam irradiated on an optical disk is positioned on track of the optical disk or not, on the basis of the light beam reflected by the optical disk; tracking error signal generating unit for generating tracking error signal on the basis of the light beam reflected by the optical disk; discriminating unit for discriminating whether the light beam irradiated on the optical disk is positioned in pre-pit area or not; holding unit for holding value of the on-track signal immediately before entrance of the light beam to the pre-pit area on the basis of discrimination result of the discriminating unit; and control unit for opening and closing the tracking servo loop in accordance with the value of the on-track signal held by the holding unit and the tracking error signal.

5 Claims, 6 Drawing Sheets

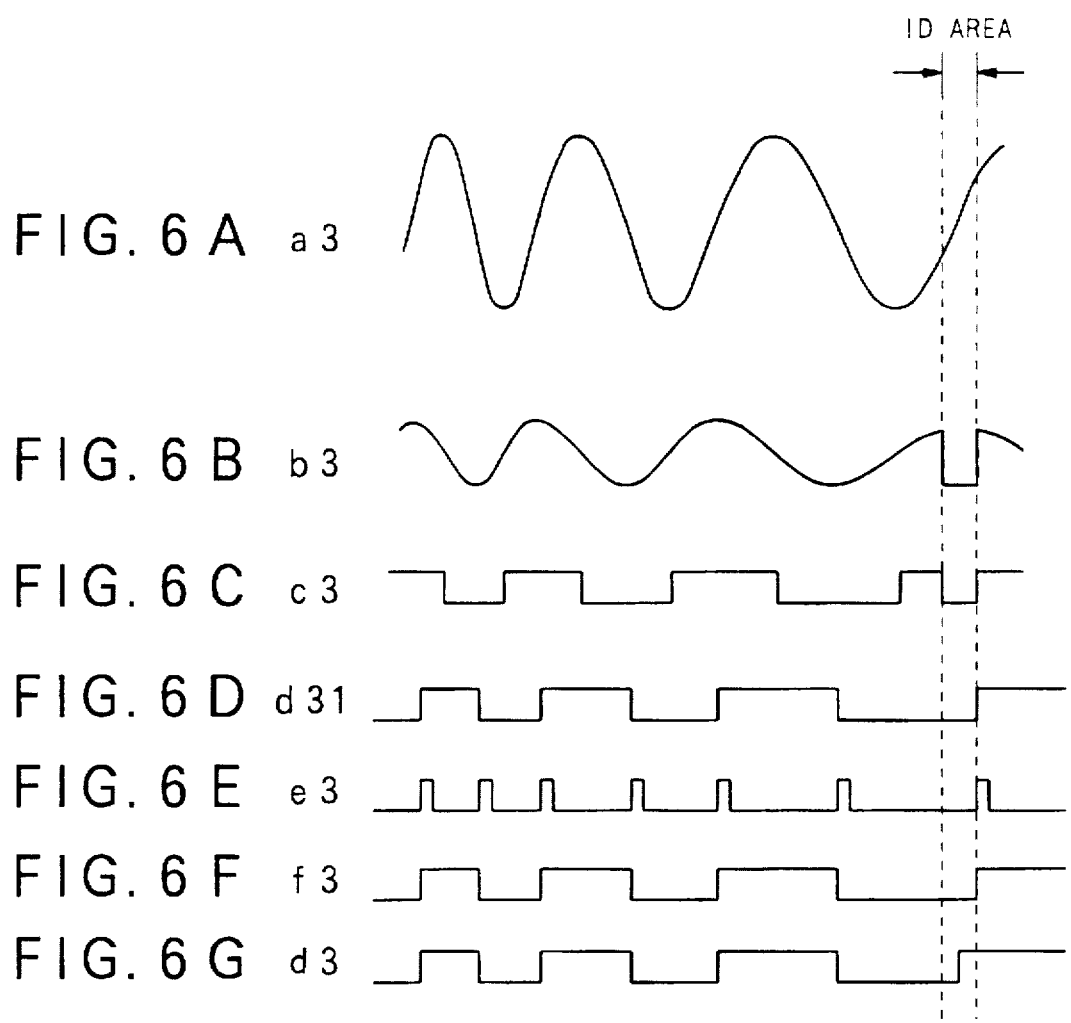

DEVICE FOR OPENING AND CLOSING A TRACKING SERVO LOOP OF AN OPTICAL DISC REPRODUCTION DEVICE IN ACCORDANCE WITH THE VALUE OF AN ON-TRACK SIGNAL

This application is a continuation of application Ser. No. 08/255,349, filed Jun. 8, 1994, now abandoned.

BACKGROUND OF THE INVENTION

1. Field of the Invention

This invention relates to servo control device for use in an apparatus for reproducing optical disk with pre-pits formed thereon, such as magneto-optical disk, and more particularly to servo control device for controlling pull-in operation of tracking servo loop.

2. Description of the Prior Art

In reproduction of optical disk, rotation of disk may occasionally raise eccentricity of disk. In order to reproduce information correctly from disk, it is necessary to move an optical pickup to accurately follow the tracks formed on the disk. To meet this requirement, tracking servo control of optical pickup is generally performed.

Conventionally, pull-in control of tracking servo loop is carried out in the following manner. Firstly, information recorded on an optical disk is read out using an optical pickup, and on-track signal and tracking error signal are produced from read-out signal. On-track signal indicates whether light beam irradiated on an optical disk is positioned on track of disk or not, and is produced on the basis of quantity of light reflected by optical disk. If light spot is positioned on track, quantity of light reflected by optical disk is large. Tracking error signal indicates whether light spot is positioned at center of track or not. Utilizing the above two signals, servo control device performs pull-in operation of tracking servo loop. Servo control device discriminates, based on the above two signals, whether or not light beam is accurately positioned on track and at center of the track. Namely, servo control device detects that light spot is positioned on track, on the basis of on-track signal, and detect that light spot is positioned at center of track, on the basis of tracking error signal. When these conditions are satisfied, the servo control device closes the tracking servo loop to perform pull-in operation.

Recently, it is known a disk having ID areas on which sector marks and/or addresses are recorded in a form of pre-pits. Pre-pits are pits formed on a disk in advance of recording of information thereon. In these disks, since pre-pits are formed in ID area, light beam irradiated on ID area is irregularly reflected, and therefore total quantity of reflected light beam is reduced even when the light spot is actually positioned on the track. As described above, conventional servo control device judges on-track condition based on light quantity of reflected light beam, and therefore the servo control device may erroneously discriminate that light beam is not positioned on track, though light beam is actually present on the track. As a result, it is likely that servo control device fails to close tracking servo loop in appropriate timing.

SUMMARY OF THE INVENTION

It is an object of the present invention to provide a servo control device for use in an apparatus for reproducing optical disk having pre-pits, by which pull-in operation of tracking servo loop is rapidly and stably performed.

According to one aspect of the present invention, there is provided a servo control device for controlling operation of tracking servo loop, including: on-track signal generating unit for generating on-track signal indicating whether a light beam irradiated on an optical disk is positioned on track of the optical disk or not, on the basis of the light beam reflected by the optical disk; tracking error signal generating unit for generating tracking error signal on the basis of the light beam reflected by the optical disk; discriminating unit for discriminating whether the light beam irradiated on the optical disk is positioned in pre-pit area or not; holding unit for holding value of the on-track signal immediately before entrance of the light beam to the pre-pit area on the basis of discrimination result of the discriminating unit; and control unit for opening and closing the tracking servo loop in accordance with the value of the on-track signal held by the holding unit and the tracking error signal.

According to another aspect of the present invention, there is provided a servo control device for controlling operation of tracking servo loop, including: on-track signal generating unit for generating on-track signal indicating whether a light beam irradiated on an optical disk is positioned on track of the optical disk or not, on the basis of the light beam reflected by the optical disk; tracking error signal generating unit for generating tracking error signal on the basis of the light beam reflected by the optical disk; discriminating unit for discriminating whether the light beam irradiated on the optical disk is positioned in pre-pit area or not; holding unit for holding value of the tracking error immediately before entrance of the light beam to the pre-pit area on the basis of discrimination result of the discriminating unit; and control unit for opening and closing the tracking servo loop in accordance with the value of the tracking error signal held by the holding unit and the on-track signal.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 6A to 6G are diagrams illustrating waveforms of signals referred to in FIG. 5.

DESCRIPTION OF THE PREFERRED EMBODIMENTS

Figure 1:
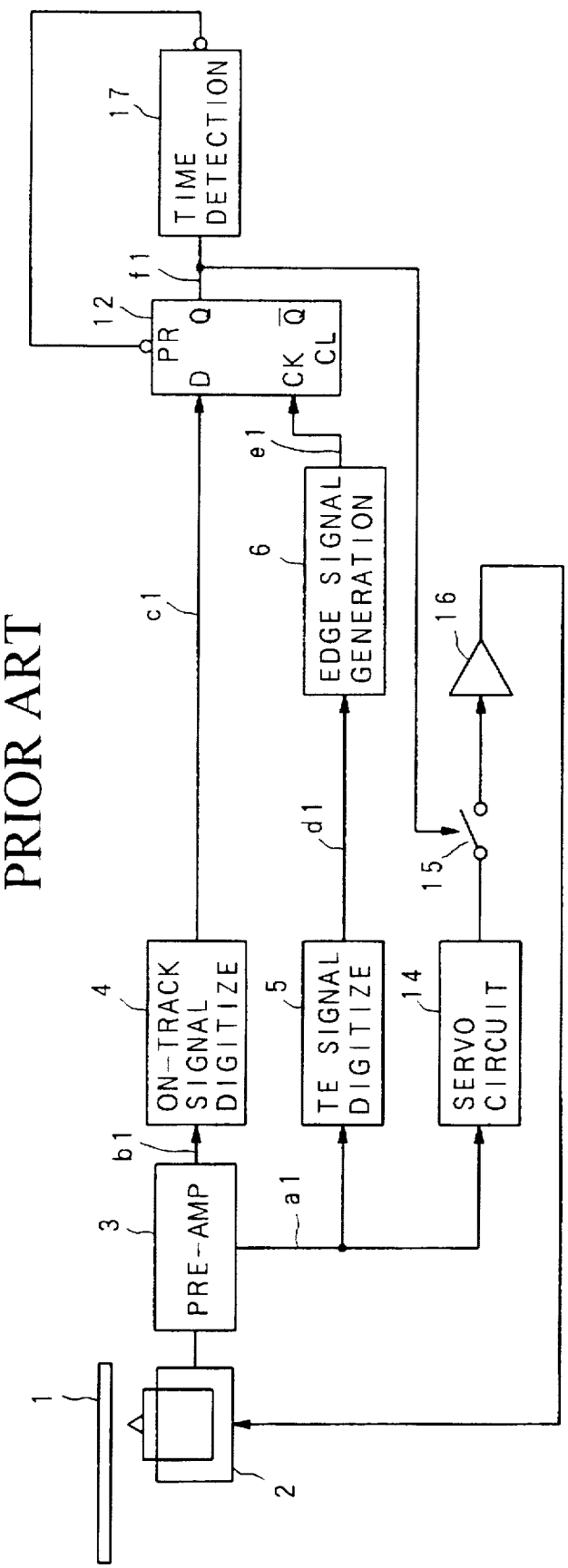
FIG. 1 is a block diagram illustrating a construction of general tracking servo control device.

Prior to description of the preferred embodiments, construction and operation of general tracking servo control device will be described, with reference to FIGS. 1 and 2A–2F. FIG. 1 illustrates a construction of general tracking servo control device, and FIGS. 2A to 2F illustrate waveforms of signals referred to in FIG. 1.

Disk 1 is a recording medium such as an magneto-optical disk, and pickup 2 optically reads out information recorded on the disk 1. Pre-amplifier 3 amplifies the signal supplied from the pickup 2, and outputs CTS (Cross Talk Signal) b1, RF signal and tracking error signal a1. On-track signal digitizing circuit 4 modifies the waveform of the CTS b1 into rectangular pulse signal, that is, digitizes the CTS b1, and outputs it as digital on-track signal c1. Details of digital on-track signal will be described later. Tracking error signal digitizing circuit 5 modifies the waveform of tracking error signal a1 supplied from the pre-amplifier 3 into rectangular pulse signal, that is, digitizes the tracking error signal a1, and outputs it as digital tracking error signal d1. Edge signal generation circuit 6 produces an edge signal e1 from the digital tracking error signal d1. The edge signal e1 includes short pulses appears at inverting points of the digital tracking error signal d1. Details of edge signal will be described later. DFF (D-type Flip-Flop) 12 latches the digital on-track signal d1 at timings when the edge signal e1 output from the edge signal generation circuit 6 rises to High level. Servo circuit 14 performs signal processing including phase compensation of the tracking error signal a1. Driver 16 drives the pickup 2 on the basis of the phase-compensated tracking error signal output from the servo circuit 14. The pickup 2, the pre-amplifier 3, the servo circuit 14, loop switch 15 and the driver 16 constitutes tracking servo loop.

Next, pull-in operation of tracking servo loop, that is, operation of leading information reading point to information track will be described. It is noted that information reading point, frequently appears in following description, means point or position at which information recorded on optical disk is read out. In a case of optical disk, information reading point means position of light spot of reading light beam.

Figure 2:
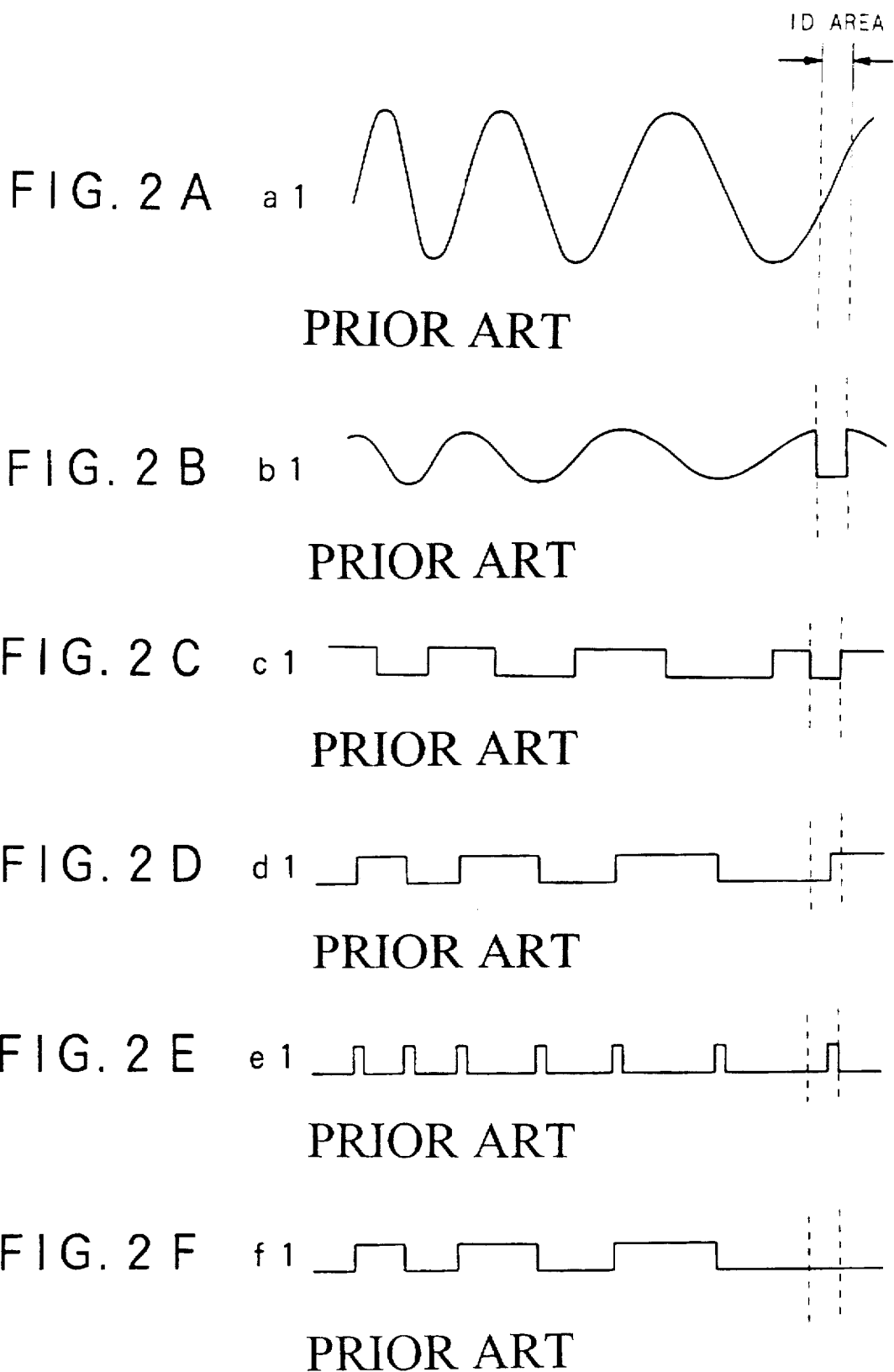
FIGS. 2A to 2F are diagrams illustrating waveforms of signals referred to in FIG. 1.

Firstly, signal recorded on the disk 1 is read out by the pickup 2, and the read-out signal is amplified by the pre-amplifier 3. The CTS b1 indicating total quantity of light reflected by the disk 1 is supplied to the on-track signal digitizing circuit 4. The waveform of the CTS b1 is modified by the on-track signal digitizing circuit 4 and output as a digital on-track signal c1, which is shown in FIG. 2C. The on-track signal digitizing circuit 4 compares the level of the CTS b1 with a reference level, and outputs High level signal when the level of the CTS b1 is larger than the reference level. Accordingly, the digital on-track signal c1 takes High level when the information reading point is located on track, and takes Low level when the information reading point is not located on track. The digital on-track signal c1 is supplied to D-input terminal of the DFF 12. In addition, out of the signals amplified by the pre-amplifier 3, the tracking error signal a1 is supplied to the tracking error signal digitizing circuit 5. The waveform of the tracking error signal a1 is modified by the tracking error signal digitizing circuit 5, and is output as a digital tracking error signal d1 which is shown in FIG. 2D. The tracking error signal digitizing circuit 5 produces digital signal whose level is inverted at zero-cross points of the tracking error signal a1. The digital tracking error signal d1 is supplied to the edge signal generation circuit 6. The edge signal generation circuit 6 generates edge signal e1 which is shown in FIG. 2E. The edge signal e1 takes High level for a predetermined time period after the inversion of level of the digital tracking error signal d1. The edge signal e1 is supplied to the CK-input terminal of the DFF 12.

Loop control signal f1 for controlling performance of loop switch 15 is output from the Q-terminal of the DFF 12. The loop control signal f1 is produced by latching the digital on-track signal c1 at the timings of risings of the edge signal e1. Namely, the loop control signal f1 holds the level of the digital on-track signal c1 at the timing of rising of the edge signal e1 and maintains the level until the next rising of the edge signal e1 arrives. The loop control signal f1 is supplied to the loop switch 15 so that the loop switch is closed when the loop control signal is High level and the loop switch is opened when the loop control signal is Low level.

When the loop switch 15 is closed, the tracking error signal a1 supplied from the pre-amplifier 3 to the servo circuit 14 is phase-compensated and supplied to the driver 16. The driver 16 converts the phase-compensated tracking error signal, which is voltage signal, into current signal to drive the pickup 2. Every time when the information reading point passes tracks, the pickup 2 is driven to the direction in which relative speed of the pickup 2 and the track decreases. Accordingly, as shown in FIGS. 2A to 2F, the relative speed of the pickup 2 and track decreases every time the loop switch 15 is closed, and hence closed time period of the tracking servo loop gets longer every time. The loop control signal f1 output from the Q-terminal of DFF 12 is also supplied to the time detection circuit 17, and the time detection circuit 17 counts the time period in which the loop control signal f1 takes High level. When the time period counted exceeds a predetermined time period, it is judged that pull-in operation of the tracking servo loop is no longer necessary. In response to this judgement, the time detection circuit 17 supplies a forced loop control signal to the PR-input terminal of the DFF 12. On receiving the forced loop control signal, the DFF 12 outputs the loop control signal f1 of High level from the Q-terminal of DFF 12, irrespective of the signal input to the CK-input terminal, so that the loop switch 15 is kept closed to perform tracking servo control.

However, as seen from FIGS. 2A–2F, when the information reading point enters ID area, total quantity of reflected light represented by the CTS b1, shown in FIG. 2B, is reduced, because of irregular reflection, though the information reading point is actually present on track. Therefore, the digital on-track signal c1 does not become High level in ID area, and the loop control signal f1 does not become High level, either. This means that the servo control device fails to close the tracking servo loop in or around ID area even when the information reading point is actually present on track.

Next, preferred embodiments of the present invention will be described below with reference to the accompanying drawings.

1st Embodiment

Figure 3:
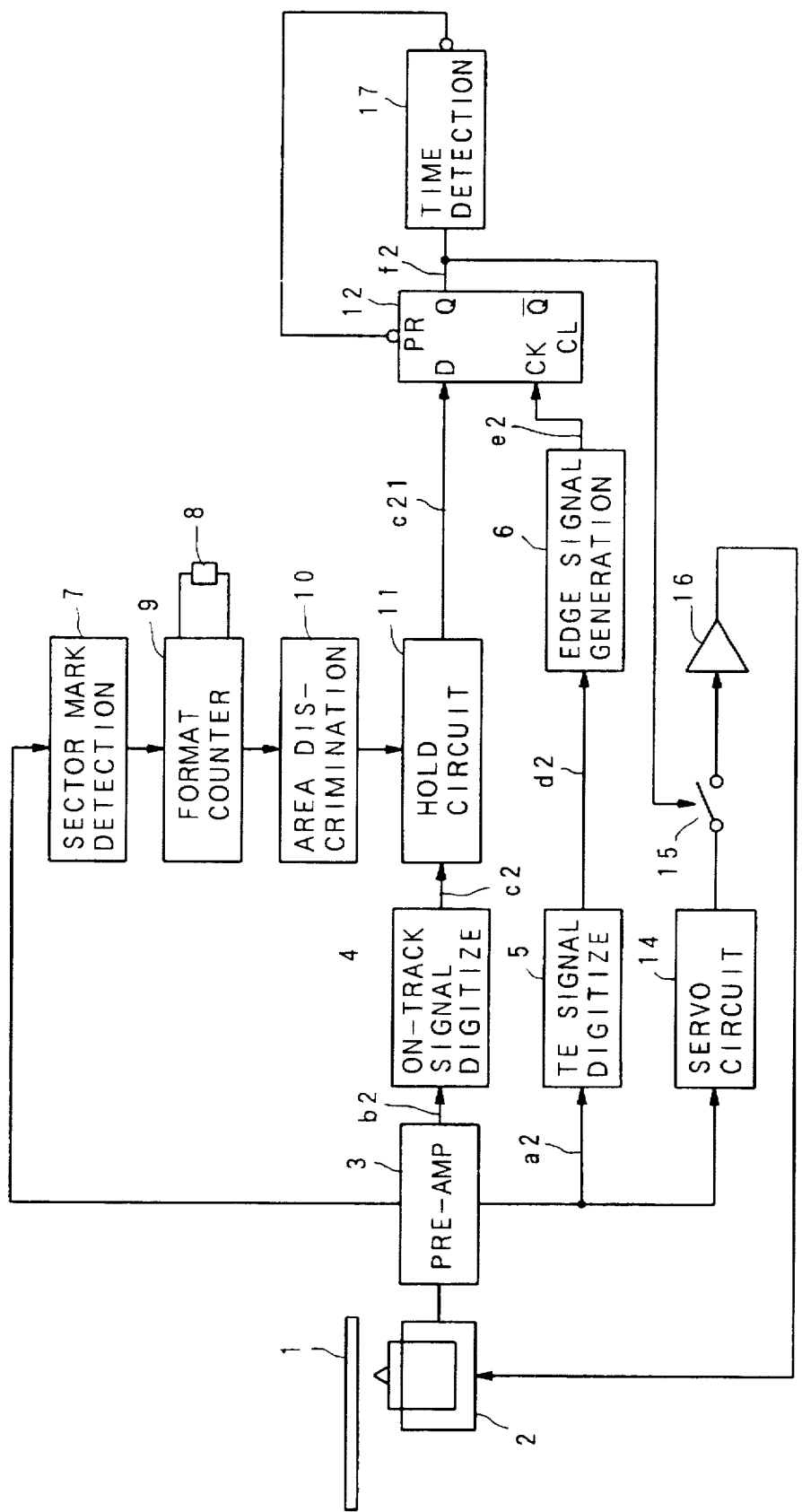
FIG. 3 is a diagram illustrating a construction of tracking servo control device according to first embodiment of the invention.

FIGS. 3 and 4A–4G describe a servo control device according to first embodiment of the present invention. It is noted that identical reference numerals are applied to components which are identical to those shown in FIG. 1. In FIG. 3, sector mark detection circuit 7 detects sector mark recorded at head portion of ID area. Sector mark is pre-pit indicating head portion of ID area. Reference clock generator 8 generates reference clock signal of a predetermined frequency. Format counter 9 counts the clock signal generated by the reference clock generator 8. Area discrimination circuit 10 discriminates, on the basis of the output from the format counter 9, area and position to which information detection point belongs. Hold circuit 11 holds the on-track signal in accordance with the output from the area detection circuit 10. Time detection circuit 17 detects length of time period in which the loop switch signal maintains High level.

Next, an operation of the servo control device will be described. Firstly, information recorded on the magneto-optical disk 1 is read out by the pickup 2, and the read-out signal from the pickup 2 is amplified by the pre-amplifier 3. The amplified CTS b2 is supplied to the on-track signal digitizing circuit 4. In the on-track signal digitizing circuit 4, the waveform of the amplified signal b2 is modified to be a rectangular pulse signal, that is, digitized, and the modified signal is output as a digital on-track signal c2. In addition, out of the signal amplified by the pre-amplifier 3, an RF signal is supplied to the sector mark detection circuit 7. The sector mark detection circuit 7 detects sector mark from the RF signal, and supplies sector mark detection signal to the format counter 9. When the sector mark detection signal is input, the format counter 9 is cleared and its count value is set to "0". Then, the format counter 9 starts counting reference clocks generated by the reference clock generator 8, and supplies the count value to the area discrimination circuit 10.

Figure 4:
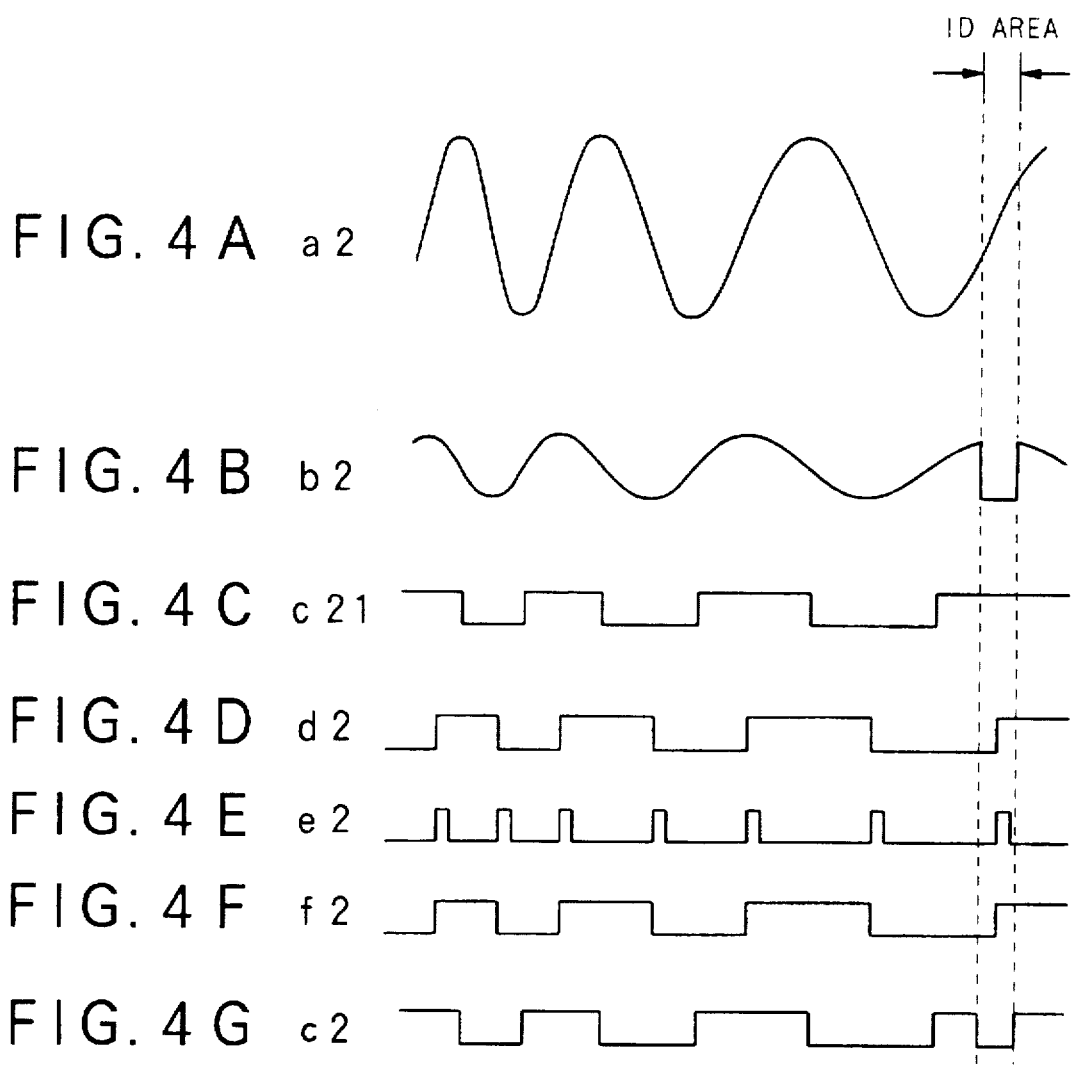
FIGS. 4A to 4G are diagrams illustrating waveforms of signals referred to in FIG. 3.

In recording information on a disk, information is recorded according to a recording format which regularly and uniformly defines capacity and order of various areas, such as ID area and information recording area. Therefore, reading same kind of areas, ID area or information recording area, for example, requires same time period. Accordingly, by referring to the count value of the format counter 9, the area discrimination circuit 10 recognizes area and position of disk at which information reading point is present. When the area discrimination circuits 10 judges that the information reading point is entering ID area, the area discrimination circuit 10 supplies a hold signal of High level to the hold circuit 11. On receiving the hold signal, the hold circuit 11 holds the value of the digital on-track signal c2 immediately before the entrance of the information reading point to the ID area. When the information reading point enters information recording area again, the area discrimination circuit 10 supplies a hold signal of Low level to the hold circuit 11 so that holding operation of the hold circuit 11 is terminated. According to the above operation, when the information reading point is in ID area, the hold circuit 11 holds the value of the digital on-track signal c2 just before the entrance to the ID area. Therefore, digital on-track signal c21 shown in FIG. 4C is obtained and is supplied to the D-terminal of DFF 12. As seen from FIG. 4F, the loop control signal f2 becomes High level in ID area. As a result, when pull-in operation of servo loop is performed at pre-pit area having pre-pits, such as ID area, the presence of the pre-pit does not obstruct timing control pull-in operation, as shown in FIGS. 4A–4G. Therefore, correct loop control signal f2 is produced even in pre-pit area. Out of the signal amplified by the pre-amplifier 3, tracking error signal a2 is digitized in the tracking error signal digitizing circuit 4, and is output as digital tracking error signal d2. Based on the digital tracking error signal d2, edge signal e2 is produced and is supplied to the CK-input terminal of the DFF 12.

In the first embodiment, during the reading of ID area, the hold circuit holds the value of the on-track signal just before the entrance of the information reading point to ID area. In a second embodiment described below, during the reading of ID area, digital tracking error signal just before the entrance of the information reading point to ID area is held and used.

2nd Embodiment

Figure 5:
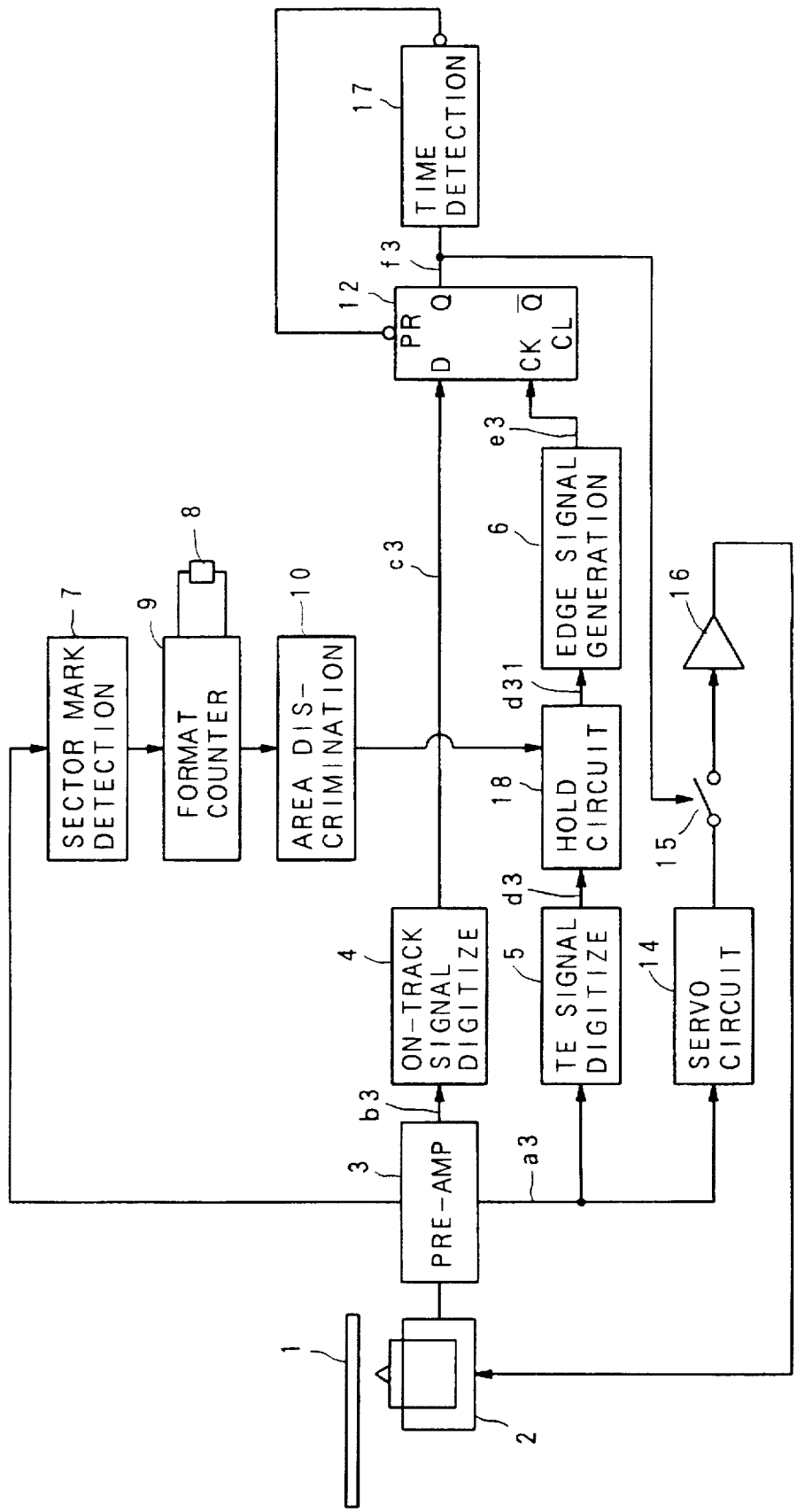
FIG. 5 is a diagram illustrating a construction of tracking servo control device according to second embodiment of the invention.

The second embodiment of the present invention will be now described with reference to FIGS. 5 and 6A–6G. As shown in FIG. 5, hold circuit 18 holds the digital tracking error signal d3 in response to hold signal of High level supplied from the area discrimination circuit 10. Since operation of the second embodiment until the discrimination of entrance of the information reading point to ID area is same as that of the first embodiment, detailed description relating thereto will be omitted.

Out of the signal amplified by the pre-amplifier 3, tracking error signal a3 shown in FIG. 6A is supplied to the tracking error signal digitizing circuit 5. The tracking error signal a3 is digitized by the tracking error signal digitizing circuit 5, and is supplied to the hold circuit 18 as a digital tracking error signal d3. On detecting the entrance of the information reading point to ID area from information recording area, the area discrimination circuit 10 supplies hold signal of High level to the hold circuit 18. On receiving the hold signal of High level, the hold circuit 18 holds the value of the digital tracking error signal d3, held in the hold circuit 18, just before the entrance of the information reading point to ID the area. When the information reading point enters information recording area, the area discrimination circuit 10 supplies hold signal of Low level to the hold circuit 18 so as to terminate holding operation of the hold circuit 18. Namely, when the information reading point is in ID area, the hold circuit 18 holds the digital tracking error signal d3 just before the entrance of the information reading point to ID area. This is illustrated in FIG. 6D. The digital tracking error signal d31 thus obtained is supplied to the edge signal generation circuit 6. The edge signal e3 supplied to the DFF 12 does not rise to High level during the ID area and rises to High level after passing by ID area. As described above, according to the second embodiment, the edge signal e3 rises to High level after the information reading point passes by ID area and on-track signal rises to High level. Therefore, the device does not fail to close the servo loop. Thereafter, pull-in operation of servo loop is performed on the basis of the edge signal e3 and the digital on-track signal c3.

According to the second embodiment described above, as illustrated by FIG. 6F, tracking servo loop is maintained opened in ID area and is closed after passing by ID area. In comparison with the first embodiment, timing of closing tracking servo loop is delayed for the time period of ID area. However, actual tracking error signal obtained in ID area includes noise component due to the presence of pre-pits, and therefore pull-in operation of tracking servo loop can not be efficiently performed. Therefore, if the tracking servo loop is closed after passing by ID area like the second embodiment, pull-in operation of tracking servo loop is performed rapidly enough.

In the above described embodiments, the format counter 9 and the area discrimination circuit 10 predicts the entrance of the information reading point to ID area, and the hold circuit 18 holds the value of the on-track signal or tracking error signal just before the entrance of the information reading point to ID area. However, it is possible to hold the on-track signal or the tracking error signal after confirming the entrance of the information reading point to ID area utilizing delay circuit or memory.

As described above, according to the servo control device of the present invention, the hold circuit holds on-track signal or tracking error signal just before the information reading point enters ID area. Therefore, tracking servo can be pulled in rapidly and stably even in a case of using optical disk, such as magneto-optical disk, whose light quantity of reflected light is not uniform because of pre-pit area, such as ID area, formed thereon.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A servo control device for controlling operation of a tracking servo loop, comprising:

on-track signal generating means for generating an on-track signal indicating whether a light beam irradiated on an optical disk is positioned on a track of the optical disk or not, on the basis of the light beam reflected by the optical disk;

tracking error signal generating means for generating a tracking error signal on the basis of the light beam reflected by the optical disk;

discriminating means for discriminating whether the light beam irradiated on the optical disk is positioned in a pre-pit area or not;

holding means for holding a value of the on-track signal immediately before entrance of the light beam to the pre-pit area on the basis of a discrimination result of the discriminating means; and control means for opening and closing the tracking servo loop in accordance with a loop switch signal produced by latching the on-track signal based on the tracking error signal.

2. A device according to claim 1, wherein said on-track signal generating means generates the on-track signal based on the quantity of light reflected by the optical disk.

3. A device according to claim 1, wherein said discriminating means comprises means for detecting head pre-pit formed at head portion of the pre-pit area.

4. A device according to claim 3, wherein said discriminating means further comprising means for counting time length from detection of the head pre-pit and means for determining position of the light beam on the basis of the time length counted.

5. A device according to claim 1, wherein said control means closes the tracking servo loop when it is discriminated that the light beam is positioned on the track based on the on-track signal and that the light beam is positioned at center of the track based on the tracking error signal.

* * * * *